United States Patent [19]

Dyer

[11] 4,426,101

[45] Jan. 17, 1984

[54] AUTOMOTIVE VEHICLE WITH IMPROVED SUSPENSION SYSTEM

[76] Inventor: Curtis A. Dyer, 2297 W. Steel La., Santa Rosa, Calif. 95401

[21] Appl. No.: 304,069

[22] Filed: Sep. 21, 1981

[51] Int. Cl.³ .............................................. B62D 9/02
[52] U.S. Cl. ..................................... 280/772; 280/788
[58] Field of Search ............... 280/781, 788, 797, 798, 280/772, 93, 96.1, 660, 663, 666, 670, 675, 96.3, 688, 689, 724, 725, 726

[56] References Cited

U.S. PATENT DOCUMENTS

| | | | |
|---|---|---|---|
| 1,892,479 | 12/1932 | Arato | 280/96.3 |
| 2,554,261 | 5/1951 | Munger | 280/788 |
| 2,746,766 | 5/1956 | Nallinger | 280/725 |
| 3,074,737 | 1/1963 | Peras | 280/724 |
| 3,261,621 | 7/1966 | Corbin | 280/666 |
| 3,869,015 | 3/1975 | Allison | 280/724 |
| 4,045,075 | 8/1977 | Pulver | 280/798 |
| 4,152,022 | 5/1979 | Castine | 296/146 |

FOREIGN PATENT DOCUMENTS

434550 4/1948 Italy .................................... 280/788
529948 12/1940 United Kingdom ................ 280/725

*Primary Examiner*—Joseph F. Peters, Jr.
*Assistant Examiner*—Ross Weaver
*Attorney, Agent, or Firm*—Owen, Wickersham & Erickson

[57] ABSTRACT

An automotive vehicle. A rigid frame encloses and protects a passenger compartment in between front and rear rigid axle assemblies. At each end of the frame is a pair of widely spaced-apart, substantially parallel struts. These are on opposite sides of and parallel to the vehicle's longitudinal axis, extending between a transverse frame member and the respective axle assembly and connected at each end by a universal joint. There is also at each end of the frame a pair of converging struts that connect a transverse frame member to an axle assembly by a universal joint at each end of each strut; these struts are wide apart at one end and close to each other at the other end. A vertically mounted combination spring and shock absorber is interposed between and bears against the frame and each axle on each side of the longitudinal axis.

24 Claims, 35 Drawing Figures

AUTOMOTIVE VEHICLE WITH IMPROVED SUSPENSION SYSTEM

This invention relates to a novel automobile with a novel frame and frame suspension.

BACKGROUND OF THE INVENTION

Most prior-art automobiles have faulty suspension systems which tend toward instability on turns. I have discovered that much of this instability is due to the location of the auotmobile roll center axis below the sprung-weight center of gravity, which shifts the load during a turn so as to increase the load on the outside tires and decreases the load on the inside tires, thereby tending to cause the automobile to lift off the inside and roll over the outside. To counteract this fault, many highways have banked turns, but some do not, and on city streets, the turns at intersections cannot be effectively banked because of continuing straight-ahead traffic and because turns are made in both directions. Here, the dangers inherent in conventional design are increased.

Another fault in conventional suspension is the number of angular resolutions of forces. This has a particularly bad effect on the car by providing for large kingpin inclination angles and cambers such that the tires are normally at an inclination to the road rather than at a right angle to it, thereby decreasing tire grip and increasing tire wear.

To counteract some of the effects inherent in conventional designs, spring and shock absorbers are made quite heavy and are usually located at an angle away from vertical rather than truly vertically. In addition to increasing the weight of the vehicle, such designs set up more bending stresses and result in difficulties in access for repair as well as adding to the manufacturing costs. The other conventional frame designs set up more bending stresses.

Another defect in automobile frame designs heretofore has been the poor visibility at the region between the windshield and the front windows and also at other regions. Attempts to add to such visibility have often led to a decrease in the protection afforded by the frame to the driver. The corner posts have been weak and the roof itself has often been very weak in structure, so that crash protection has been ineffectual. Poor visibility has been worsened by the use of curved glass, which also has increased the cost of the vehicle.

Another failing of conventional automobiles has been that the doors have failed to provide adequate crash protection for the occupants.

A further notorious failure in crash protection has been the inability of the bumpers heretofore in use to absorb crash energy.

In conventional designs, the driver has been placed in a relatively unsafe position. Moreover, the structure of the adjacent dashboard and other interior furnishings have increased the likelihood of injuries in the event of a crash.

OBJECTS OF THE INVENTION

One object of the present invention is to provide a frame and suspension system for automobiles which offers increased protection and safety to the occupants. Another object is to increase the safety in turns. Another object is to increase protection in the event of a crash.

A further object is to make the vehicle lighter in weight and less expensive to operate, to manufacture, and to keep in repair.

Another object is to provide the occupants with more comfortable riding conditions.

Other objects and advantages of the inventions will appear from the following description.

SUMMARY OF THE INVENTION

An automobile of this invention has rigid front and rear axle assemblies, each having wheels rotatably mounted at each end, the front axle assembly having a steering system for turning its wheels. A rigid frame, enclosing and protecting a passenger compartment, is located mainly in between the front and rear axle assemblies and has forward and rear transverse members respectively near each end of the frame.

A pair of widely spaced-apart parallel rear struts lie on opposite sides of and parallel to the car's longitudinal axis. Each forward strut extends between a forward transverse member of the frame and the front axle and is connected to each of them by a rubber spherical connection or ball-and-socket joint. Similarly, a pair of widely spaced-apart parallel rear struts lie on opposite sides of and parallel to the longitudinal axis and extend between a rear transverse member of the frame and the rear axle, each strut being connected to each of them by a rubber spherical connection or ball-and-socket joint. The front struts are wide apart from each other at one end and closely adjacent to each other at the other end. Similarly, a pair of converging rear struts lie on opposite sides of the longitudinal axis, each extending between a rear transverse member and the rear axle and connected to each of them by means of a rubber spherical connection or ball-and-socket joint. The converging rear struts are also wide apart from each other at one end and closely adjacent to each other at the other end.

Between the frame and each axle on each side of the longitudinal axis are vertically mounted spring means, preferably including shock absorbers.

In a preferred form of the invention, the converging front struts are secured together with a ball-and-socket connection at their closely adjacent ends along a common vertical axis which intersects the car's longitudinal axis; also, the converging rear struts are secured together with a ball-and-socket connection at their closely adjacent ends along another common vertical axis, which also intersects the longitudinal axis.

The suspension system of this invention locates the roll center axis higher than do standard suspension systems, placing it above the sprung-weight center of gravity. Therefore, the system is more stable and is safer in a turn, due to the instantaneous loading of the inside tire by the centrifugal force. Thus, a vehicle embodying the invention banks into turns like a roller coaster.

A vehicle which has a higher roll center axis is less likely to tip over and is more stable in all dynamic situations. In the suspension design of this invention, the loads from the car's weight and from the axles are applied directly to the frame with a minimum of bending stresses, so that the frame can be made light, rigid and simple to manufacture. The frame has a triangulated welded, solid bar, window frame and roof structure which makes it safer and provides maximum visibility. The front and rear axle assemblies provide a structure which increases the height of the roll centers. The axle bearing housing at each wheel is efficient and simple to manufacture.

The suspension system of the invention has a longer camber trail distance and has no, or very small, kingpin inclination angle. Therefore, the tires are at right angles or nearly at right angles to the road at all times, thereby mating the tire to the road for maximum tire grip, higher tire mileage, and improve dynamic stability.

The suspension system of this invention enables the selection of a lighter design and weight of shock absorber and spring because the suspension system has all spring-shock-absorber units in a vertical position. The lower the load on the spring, the lower the loading on all related parts.

The invention preferably uses a novel strut system, which provides an extraordinarily light and efficient suspension system for a vehicle. The strut ends are lighter and stronger due to double shear stress loading on the axle or frame and a minimum of bending stresses. They are inexpensive to manufacture.

All the parts of the suspension system, including the front and rear axles, the bearing housings, the struts and the spring-shock-absorber units, can be lighter, stronger, and less expensive to manufacture than is possible for conventional systems, and they are easy to work on and repair. They may all be made from standard materials and put together by standard fasteners.

The frame of this invention is structured to hold bending stresses to a minimum, because of the triangulated design and the suspension sprung weight loadings and possible crash loadings are distributed over the frame by, or mainly by, straight members that link all of the load points. These straight members are loaded only in simple tension and compression, so that they can be made from light structural tubing. Bending stresses are avoided, as in aircraft design, to keep the weight low. The frame is light, strong, triangulated and structurally efficient.

The thin, strong, solid metal, window posts that hold the roof in place and frame the glass windows give the driver almost 100% of the 360° visibility out of the interior of the automobile. The roof and posts also provide the maximum in safety. The vehicle roof in this invention includes an X-frame structure that makes it safer in a crash, due to its strength, and thereby affords passenger crash protection. A solid piece of crash-absorbing material covers the entire inside of the roof for passenger safety.

Flat safety glass may be used in all window applications; flat glass is strong and is much less expensive than curved glass, and it is held in place by a simple straight-line frame. The window frames are light, strong, and inexpensive to manufacture.

The doors absorb crash energy and protect the passengers. The door, door lock, bolt mechanism and the door hinges are light, strong, safe and inexpensive to manufacture. The door lock bolt preferably slides into position for locking by the operator; it is light in weight and is fail safe. The door hinges are light in weight, strong, and inexpensive to manufacture. Each part is easy to work on and repair and may use only standard materials, parts and fasteners.

The bumpers, too, absorb crash energy and protect the passengers.

The dashboard and the whole interior employs crash-absorbing material, such as thick foam rubber, fastened to every panel, thereby helping to protect passengers from injury. The dashboard is covered with crash-absorbing material.

An efficient way of utilizing plastics in automobile manufacturing is by using a novel body connector described herein.

The driver sits in the center of the vehicle for maximum protection in the event of a collision from either side and also for the best visibility.

DESCRIPTION OF MORE PREFERRED EMBODIMENTS

Figures 1, 4, 5:
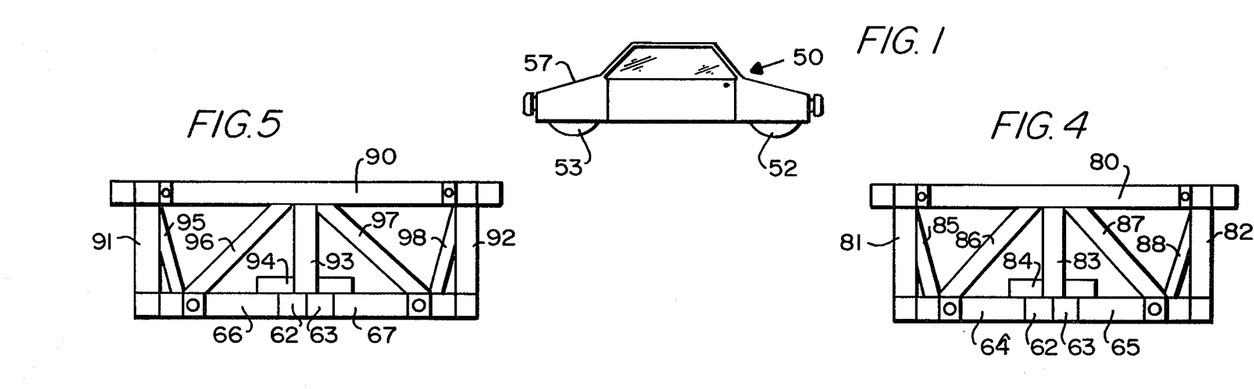
FIG. 1 is a view of an automobile embodying the principles of the invention.
FIG. 4 is a view in section taken elong the line 4—4 in FIG. 3.
FIG. 5 is a view in section taken along the line 5—5 in FIG. 3.
Figure 2:
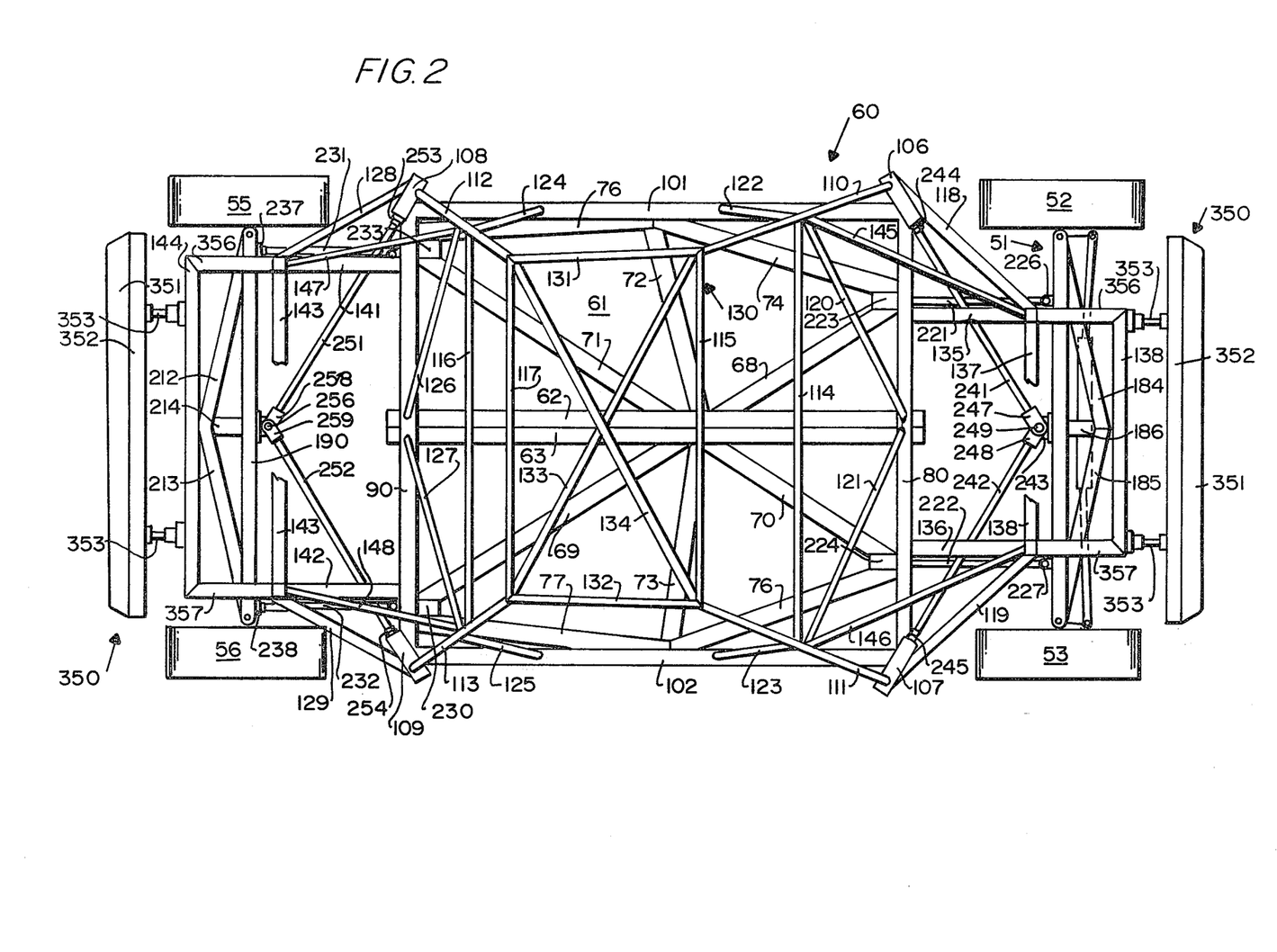
FIG. 2 is a top plan view of the frame and frame suspension of the automobile of FIG. 1, the body, engine, and most other parts being removed.
Figure 3:
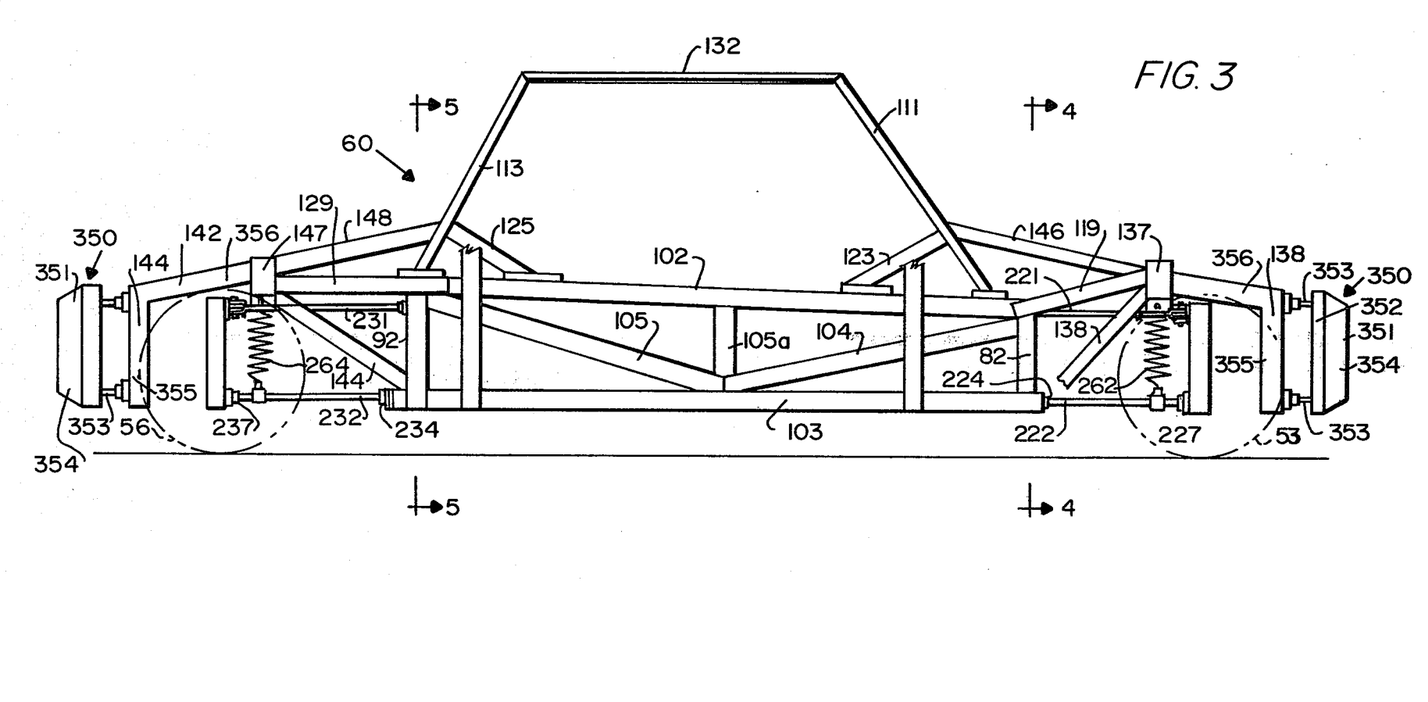
FIG. 3 is a view in side elevation of the frame and frame suspension of FIG. 2, the wheels tires being shown in broken lines.

FIG. 1 shows an automobile 50 embodying the principles of the invention, while FIGS. 2 and 3 show the frame and frame suspension.

The automobile 50 embodying the invention has a rigid front axle assembly 51 with wheels 52 and 53 mounted for rotation at the opposite ends of the axle assembly 51. The automobile 50 also has a rigid rear axle assembly 54 with wheels 55 and 56 mounted for rotation on it at its opposite ends. The axle assemblies 51 and 54 are supported by their wheels as unsprung weight. The automobile 50, as shown in FIG. 1, also has a body 57, which is carried by a rigid frame 60, shown in FIGS. 2 and 3.

The Frame 60 (FIGS. 2 to 5)

The rigid frame 60 is mounted as sprung weight on the axles 51 and 54, and, as will be seen, is also connected to them by pairs of parallel and converging struts. A passenger compartment 61 is contained within and protected by the rigid frame 60.

In one form of the invention, shown in FIGS. 2 to 5, the frame 60 has the following construction:

Running fore and aft along the longitudinal centerline of the vehicle 50 and welded together on two rectangular tubes 62 and 63, within which are carried several of the electrical conduits and wires and the hydraulic lines for the vehicle 50. At their front ends, the tubes 62 and 63 are welded, respectively to lower transverse front frame members 64 and 65 (FIG. 4), while at their rear ends, the tubes 62 and 63 are welded, respectively to lower transverse rear frame members 66 and 67 (FIG. 5). To the tubes 62 and 63 are also welded diagonal members 68, 69, 70, and 71. The member 68 extends from near the left-hand end of the member 64, and the member 69 is in line with the member 68, going to the right-rear side of the member 67. Similarly, the member 70 extends from the right hand side of the member 65, and the member 71 is in line with the member 70 and goes to the left rear side of the member 66. Meeting the members 62, 68, and 71 at their vertex is a substantially transverse member 72; a similar substantially transverse member 73 meets the members 63, 69, and 70 at their vertex. Another set of frame members 74, 75, 76, and 77 complete the bottom portion of the frame. The member 74 runs from near the vertex where the members 64 and 68 meet to the outer end of the member 72, with the member 75 running from there to the outer end of the rear member 66, just outside of the end of the member 71. Similarly, the member 76 runs from near the vertex where the members 65 and 70 meet to the outer end of the member 73, with the member 77 running from there to the outer end of the rear member 67, just outside of the end of the member 69.

At the front end of the passenger compartment 61, above the lower front transverse members 64 and 65, is an upper transverse horizontal frame member 80. The transverse horizontal frame members 64, 65, and 80 are joined together and reinforced by vertical corner members 81 and 82, a vertical central member 83 secured to a horizontal strengthening member 84, and by diagonal frame members 85, 86, 87 and 88 (see FIG. 4). At the rear end of the passenger compartment 61 (see FIG. 5), are corresponding members: an upper transverse horizontal frame member 90, vertical corner members 91 and 92, central vertical member 93, horizontal strengthening member 94, and reinforcing diagonal frame members 95, 96, 97, and 98.

Upper side frame members 101 and 102 and lower side frame members 103 connect the front frame members 80 and 64, 65 to the respective rear frame members 90 and 66, 67. There may also be diagonal strengthening members 104 and 105 at the sides, along with a vertical central member 105a, the two sides being like each other.

At each end of the upper front frame member 80 is welded a reinforcing and support corner member 106, 107, and similar members 108 and 109 are welded at each end to the upper rear frame member 90. From each support member 106, 107 rises a roof post 110, 111, extending upwardly, rearwardly, and inwardly to a roof frame 130, while from the corresponding rear support members 108 and 109, roof posts 112 and 113 rise upwardly, forwardly, and inwardly to the roof frame. The front roof posts 110 and 111 are bridged halfway up by a horizontal member 114 (above which lies the windshield) and at the top by a horizontal roof frame member 115, and the rear roof posts 112 and 113 are bridged by a horizontal member 116 halfway up and at the top by a roof frame member 117. Extending forwardly from the support members 106 and 107 at an angle are front members 118 and 119. The upper part of the frame 60 is strengthened by eight diagonal rods 120, 121, 122, 123, 124, 125, 126, and 127 meeting both the posts 110, 111, 112, 113 and the transverse members 114 and 116 at a vertex. Thus, the rods 120 and 121 extend up from near the center of the upper front frame member 80 to the roof posts 110 and 111 respectively, and the rods 122 and 123 extend up from side members 101 and 102 to the roof posts 110 and 111. The rods 124 and 125 extend up from the side frame members 101 and 102 to meet the rear roof posts 112 and 113 respectively, and the rods 126 and 127 join the upper rear frame member 90 to the roof posts 112 and 113. Thus, the roof post 110 is joined at about its midpoint by two such rods 120 and 121, and the other roof posts 111, 112, and 113 are similarly strengthened and supported. From the rear support members 108 and 109 extend diagonal members 128 and 129 respectively.

The roof frame 130 includes, in addition to the front and rear horizontal members 115 and 117, side members 131 and 132 and diagonal members 133 and 134. The eight roof post supports 120, 121, 122, 123, 124, 125, 126, and 127, combined with the transverse bars 114 and 116 and the roof bars 115, 117, 131, 132, 133, and 134 make the roof frame 130 almost indestructable.

The frame 60 has forwardly extending members 135 and 136 that are secured to the upper front frame member 80 on opposite sides of the car's longitudinal axis, and the members 135 and 136 are joined by two parallel transverse members 137 and 138. The rear upper frame member 90 likewise has two spaced-apart side frame members 141 and 142 extending rearwardly, and these are joined by two parallel transverse members 143 and 144. The transverse members 137 and 143 are connected rigidly to the frame members 118, 119 and 128, 129, respectively.

From the vertex where the members 120 and 122 meet the roof post 110, a reinforcing member 145 extends down to the left end of the transverse member 137, where it is welded to the member 135. Similarly, from the vertex where the members 121 and 123 meet the roof post 111, a reinforcing member 146 extends down to the right end of the transverse member 137, where it is welded to the member 136. At the rear, there are similar members 147 and 148, similarly located.

Thus, the frame 60 affords occupants of the passenger compartment 61 protection from the front and rear, bottom and top, and each side. The body 57 adds to this protection, as do other parts of the automobile 50.

The Front Axle System (FIGS. 6–12)

Figures 6, 7, 8, 9, 10, 11, 12:
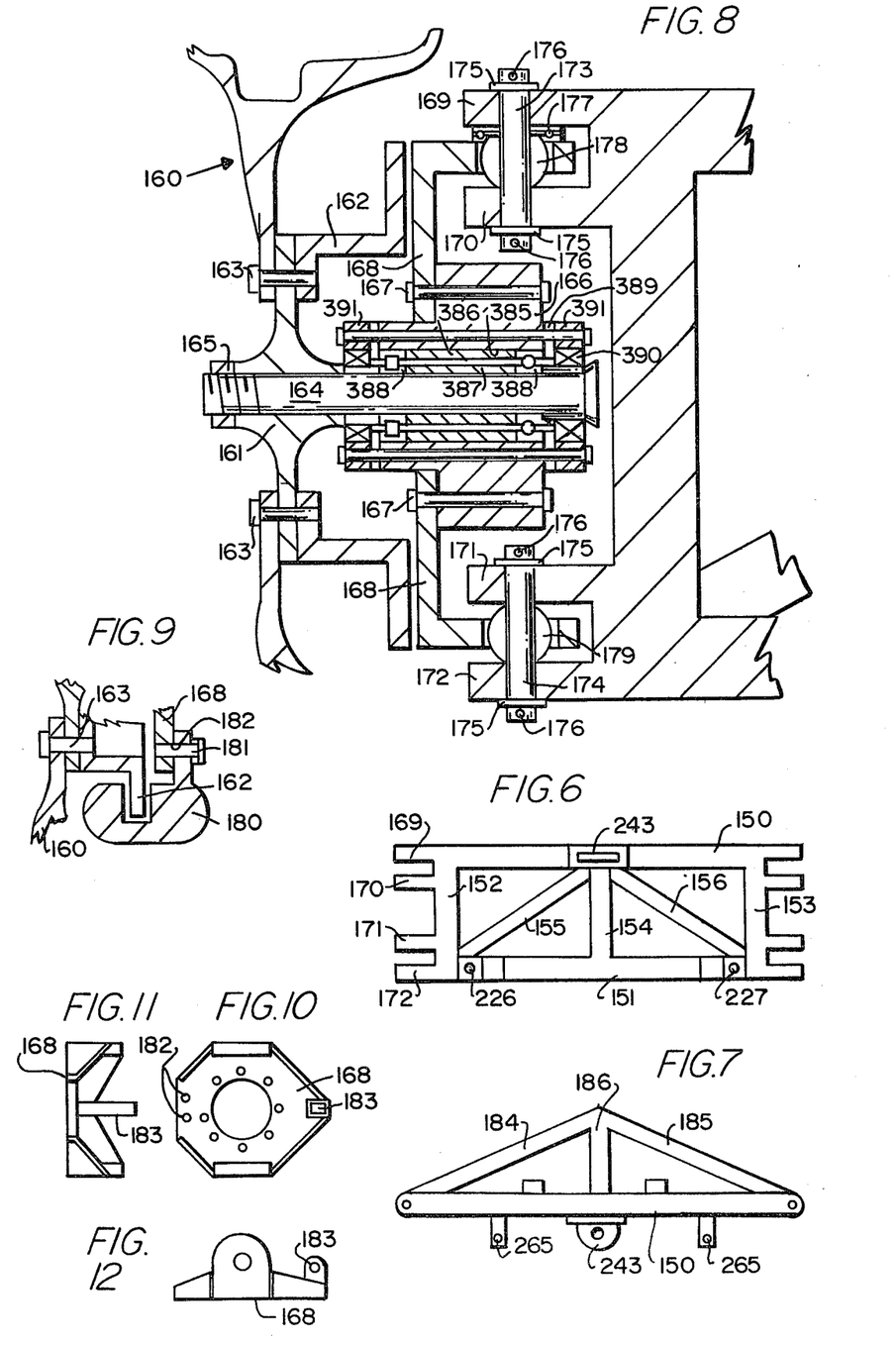
FIG. 6 is a view in front elevation of the front axle assembly.
FIG. 7 is a plan view thereof.
FIG. 8 is a fragmentary enlarged view in section of one end of that axle, showing a wheel mounted thereon.
FIG. 9 is a fragmentary view in section, taken at a right angle to FIG. 8 of the brake calipers and associated wheel parts.
FIG. 10 is a view in end elevation of the front plate of FIGS. 8 and 9.
FIG. 11 is a view in end elevation of FIG. 10, looking from the left of that view.
FIG. 12 is a view in side elevation of FIG. 10, looking up from below that view.

FIGS. 6 and 7 show the front axle assembly 51. As shown in FIG. 6, an upper rigid beam 150 is joined to a lower rigid beam 151 by vertical end members 152 and 153, central vertical member 154, and diagonals 155 and 156.

A wheel assembly 160, (FIG. 8) is fastened to a wheel hub 161 and to a brake disc 162 by wheel fastener bolts 163. The wheel hub 161 is fastened to a front axle shaft 164 by an axle nut 165 and by splining the wheel hub 161 to the axle shaft 164. The axle shaft 164 rotates in a bearing housing 166, which is fastened by fastener bolts 167 to an annular front plate 168. The front plate 168 is attached to upper clevis arms 169 and 170 and lower clevis arms 171 and 172 of the front axle assembly 51 by upper and lower kingpins 173 and 174, each provided with two flat washers 175 and two cotter pins 176 extend through a thrust bearing 177 and spherical bearings 178 and 179.

At the upper kingpin 173, the thrust bearing 178 transfers the vehicle and axle weight to the front plate 168. At both the upper and lower kingpins 173 and 174, the respective spherical bearings 178 and 179 take braking, turning, and other loads. The kingpin inclination angle is the angle between the vertical center plane of the wheel 160 and the center line through the two kingpins 173 and 174. The camber trail is the distance on the ground from the vertical center plane of the wheel 160 and the center line through the two kingpins 173 and 174. There is, thus, no, or very small, kingpin inclination angle in the present invention, and the camber trail is about three inches.

Disc brake calipers 180 (FIG. 9) are fastened to the front plate 168 by two fastener bolts 181 that go through openings 182 in the front plate 168 (see FIG. 10).

Steering rods (not shown here) are attached to the left and right front plates 168 at a steering boss 183. When the steering mechanism is mounted in front of the front axle assembly 51, the left-to-right distance from the wheel 160 to the steering boss opening 183 is shorter than the left-to-right distance from the wheel 160 to the center of the spherical bearings 178, 179, due to the increased slip angle on the more heavily loaded outside tire in a turn. If the steering mechanism is mounted behind the front axle 51, the left-to-right distance from the wheel 160 to the steering boss opening 183 is longer than the left-to-right distance from the wheel 160 to the center of the spherical bearings 178 and 179, due to the increased slip angle on the more heavily loaded outside tire in a turn.

The front axle 51 is strengthened by triangulation strength members 184 and 185 and a central member 186 going from the vertex of the members 184 and 185 to the member 150 (FIG. 7). The above-described front axle configuration is only an example of many possible configurations.

Figure 13:
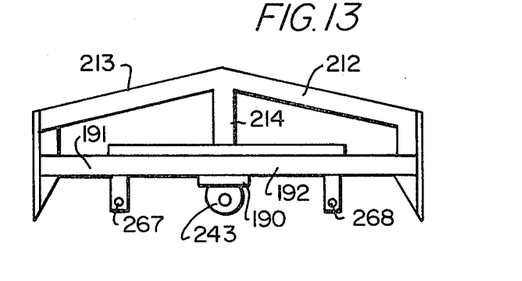
FIG. 13 is a view in front elevation of the rear axle assembly.
Figure 14:
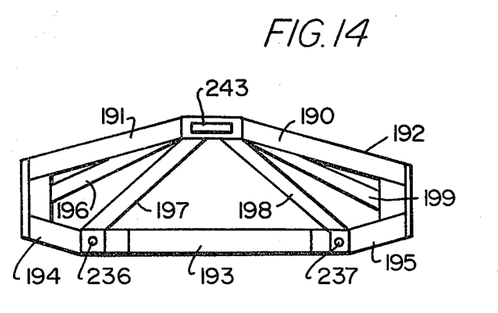
FIG. 14 is a plan view of the rear axle assembly.
Figure 15:
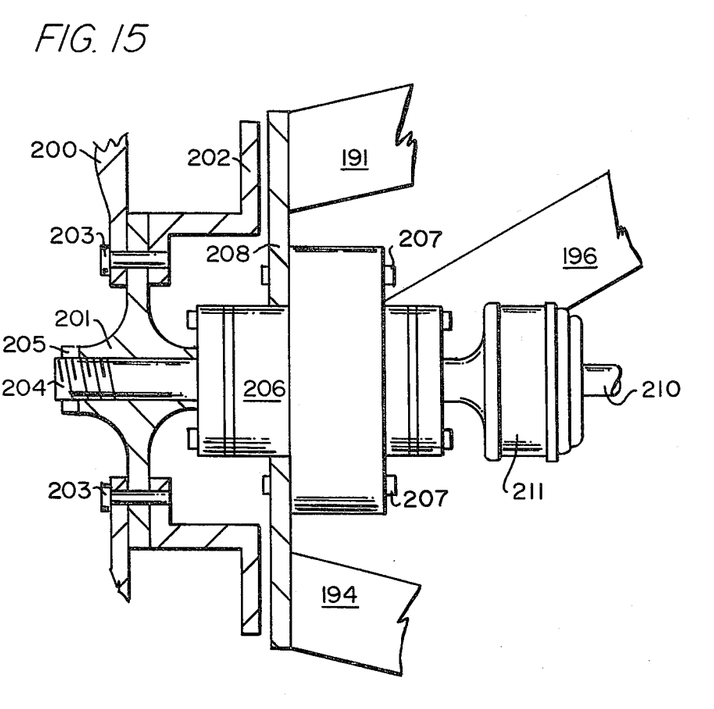
FIG. 15 is an enlarged fragmentary view in section of the rear axle assembly.

The Rear Axle Assembly 54 (FIGS. 13–15)

FIGS. 13 and 14 show the rear axle assembly 54. The assembly 54 includes a rigid upper member 190 with side portions 191 and 192 which slope down under and outwardly from a horizontal center portion. A rigid lower member 193 has upwardly sloping ends 194 and 195. The members 190 and 193 are joined by diagonal members 196, 197, 198, and 199.

A rear wheel assembly 200 is fastened to a wheel hub 201 and a brake disc 202 by wheel fastener bolts 203. The wheel hub 201 is fastened to a rear axle shaft 204 by an axle nut 205 and by splining the wheel hub 201 to the axle shaft 204. The axle shaft 204 rotates in a bearing housing 206 which is fastened by bolts 207 to an annular rear plate 208.

A drive shaft 210 is connected to a drive shaft U-joint 211, which is bolted to the rear axle shaft 204. The rear plate 208 is welded to the upper tube 191, to the lower tube 193 and to one of the angle tubes 196, making up the integral rear axle 54. The disc brake calipers are attached as in the front axle. The vehicle may have front drive, four-wheel drive, rear-wheel drive or multi drive, and the above described rear axle configuration and drive is only an example of many possible configurations.

The rear axle assembly 54 is strengthened by triangulation members 212 and 213, with a member 214 at the center (FIG. 14).

The Struts (FIGS. 2, 3, 16 and 17)

Slightly inboard from the lower side frame members 103, two parallel forward struts 221 and 222 (see FIG. 2) are joined to respective bosses 223 and 224 on the lower front frame members 64 and 65, each by a rubber spherical bearing 225 or a ball-and-socket joint (see FIG. 16), there being a rubber spherical bearing assembly or ball-and socket joint at each end of each strut 221 and 222. At its forward end, each strut 221 or 222 is joined to bosses 226 and 227 (see FIG. 7) of the front axle member 150 by a ball-and-socket joint or a rubber spherical bearing assembly 228.

Similarly, two parallel rear struts 231 and 232 are each joined to bosses 233 and 234 on the lower rear frame members 66 and 67 by a ball-and-socket joint or rubber spherical bearing assembly 235 and to bosses 236 and 237 on the rear axle assembly 54 (see FIG. 14) by a ball-and-socket joint or rubber spherical bearing assembly 238. The struts 221, 222, 231, and 232 are all parallel to the longitudinal axis of the frame 60.

Two converging front struts 241 and 242 extend, in this form of the invention, from the reinforcing members 106 and 107 at the ends of the upper front frame member 80 to a boss 243 on the front axle member 150. The connections to the members 106 and 107 are made by respective rubber spherical bearing assemblies 244 and 245 like those for the struts 221 and 222, or by ball-and-socket joints. At the axle boss 243, however, there is a single ball 246, with each strut 241, 242 having an asymmetric clevis 247, 248 and a ball 249 passing through them, through the boss 243, and also through the ball 246 and fastened by a nut.

Similarly, two converging rear struts 251 and 252 are joined to the reinforcing members 108 and 109 of the upper rear frame member 90, by respective rubber spherical bearing assemblies 253 and 254 (or by ball-and-socket joints). At the rear axle assembly 54, a boss 255, a ball 256, and a bolt 257 secure asymmetrical clevises 258 and 259 of the struts 251 and 252.

The frame 60 is also joined to the axle assemblies 51 and 54 by spring-shock-absorber assemblies 261, 262, 263, and 264. Thus, the spring assemblies 261 and 262 engage bosses 265 and 266 on the front axle assembly 51 and join them to the frame members 136 and 137, each preferably adjacent to or at the point where its frame member 136 and 137 meets at each of its ends the transverse frame member 138. Similarly, the springs 263 and 264 engage bosses 267 and 268 on the rear axle assembly 54 and join them to the frame member 143 where it meets its frame members 141 and 142 at each end.

Thus, the frame 60 is joined to the axle assemblies 51 and 54 by the vertically mounted spring units 261, 262, 263, and 264 by the fore-and-aft extending parallel struts 221, 222, 231, and 232, and by the converging struts 241, 242, 251 and 252.

Figure 16:
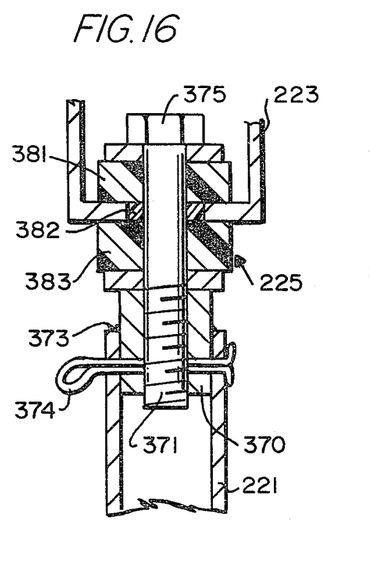
FIG. 16 is a fragmentary top plan view of a forward strut joining the front of the frame to the front axle.
Figure 17:
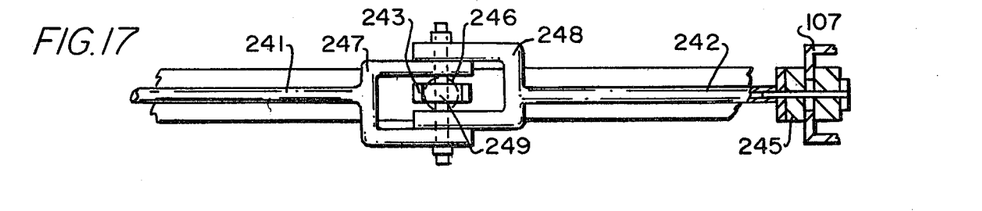
FIG. 17 is a fragmentary view of two converging struts joining the front of the frame of the front axle.

The spherical bearing assemblies 225, 228, 235, 238, 244, 245, 253, and 254 may all be identical or substantially so. Thus, FIG. 16 shows the bearing assembly 225 for the strut 221. The strut 221 has a threaded end cap 370, into which is threaded a bolt 371, which is welded at 373 to the strut 221. A cotter pin 374 locks the bolt 371 in place. Between the boss 372 and the bolt's head 375 is secured the frame boss 223 and the bearing assembly 225, with a metal washer 376 between the bolt head 375 and the bearing assembly 225 and a metal washer 377 between the bearing assembly 225 and the boss 372.

The bearing assembly 225 comprises three cylindrical washers 381, 382, and 383. The outer washers 381 and 383 are large and thick; the inner washer 382 is smaller and thinner. The bolt 371 can flex in any direction; hence the term "spherical". Thus, the assembly 225 is not a sphere, but it functions spherically in cooperation with the bolt 371.

Variations in Structure (FIGS. 18-21)

Figure 18:
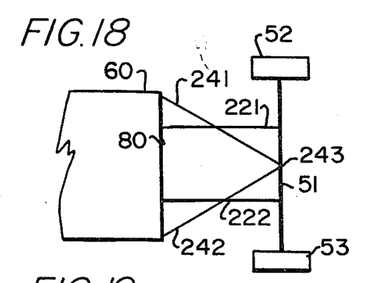
FIG. 18 is a diagrammatic plan view of the front portion of the frame and suspension as shown in FIG. 2.

The actual structure of these junctures may be varied, as is shown in FIGS. 18-21. FIG. 18 is a diagrammatic representation of the structure just described. In this instance the front struts 221 and 222 extend from the lower front frame members 64 and 65 to the front axle member 51, and the converging struts 241 and 242 extend from near the ends of the upper front frame member 80 to the boss 243 at the center of the front axle assembly 51, on the top member 150 thereof.

Figure 19:
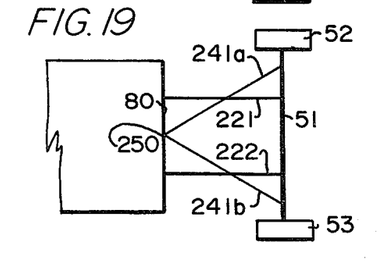
FIG. 19 is a view similar to FIG. 18 of a modified form of frame suspension system according to the present invention.

The same structure, however, may be used, as shown in FIG. 19, with the converging struts 241a and 241b meeting at a common point 250 on the frame member 80 instead of at the axle 51.

Figure 20:
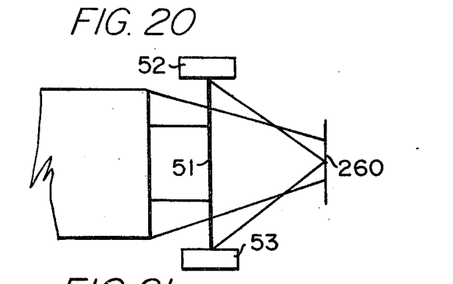
FIG. 20 is another view similar to FIG. 18 of another modified form of frame suspension system according to this invention.
Figure 21:
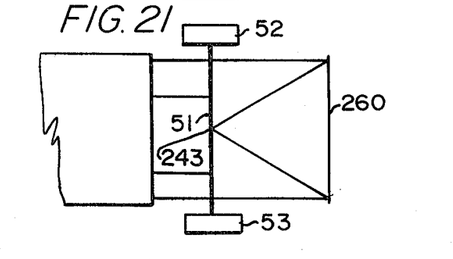
FIG. 21 is a further view similar to FIG. 18 of yet another modified frame suspension system embodying the present invention.

FIGS. 20 and 21 show the same basic structure extending between the axle 51 and a frame portion 260 forward of the axle 51. The connection with the rear axle 54 may be similarly varied, as in FIGS. 18-21.

Figure 22:
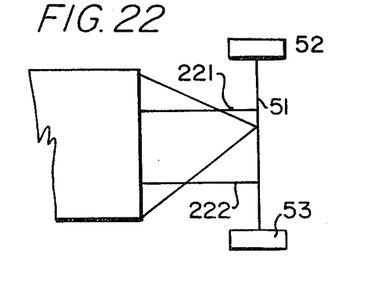
FIG. 22 is a diagram similar to FIG. 18 of an off center installation.
Figure 23:
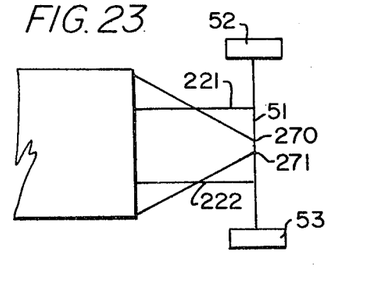
FIG. 23 is a similar diagram of a modified form of mounting the converging struts.

The Converging Struts (FIGS. 22 and 23)

In the form of the invention shown in FIG. 2, the front converging struts 241 and 242 actually terminate at a common point on the front axle, along a common vertical axis which lies at the center of the axle. However, for special applications, the common point may be located off-center, as shown in FIG. 22. Also, the struts 241 and 242 may not meet but may converge to separate points 270 and 271 either on center or somewhat off-center (FIG. 23). An example of such a use is for a racing car on a speedway in which all the turns lie in the same direction, so that it would be advisable to have the car somewhat asymmetrical in that respect to obtain better action on the turns, and quite satisfactory action still on the straightaways.

Figure 24:
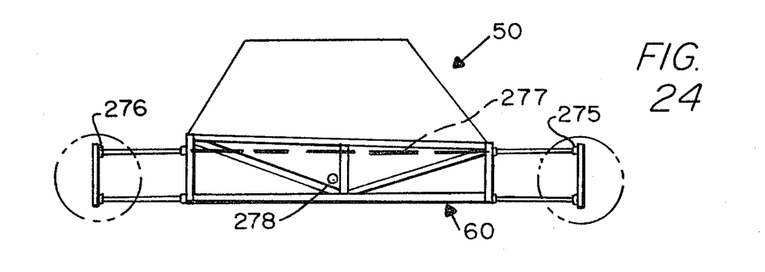
FIG. 24 is a diagrammatic view of the automobile of FIG. 1 to illustrate the location of the roll center axis and the center of gravity.

The Roll Centers (FIG. 24)

Front and rear roll centers 275 and 276 are located, respectively, at the connection of the converging front struts 241 and 242, and the converging rear struts 251 and 252 on the axle connections. The roll center axis 277 is a straight line through the front and rear roll centers 275 and 276. The front and rear axle assemblies 51 and 54 comprise the unsprung weight. The frame 60 and all that is connected to the frame is the sprung weight. In a turn, the center of gravity 278 of the sprung weight is forced outwardly due to centrifugal force. This force rotates the center of gravity 278 of the sprung weight about the instantaneous roll center axis 277. The center of gravity 278 of the sprung weight is below the instantaneous roll center axis 277. In a turn, the car 50 rolls into a turn as in a roller coaster, increasing the load on the inside tires and increasing the dynamic stability of the vehicle.

The front longitudinal struts 221 and 222 and the rear longitudinal struts 231 and 232 may, if desired, be at small angles to the forward direction of the vehicle, instead of truly parallel. The height of the front roll center 275 may be different from that of the rear roll center 276.

In a turn, the rotation of the vehicle is limited by the spring-shock-absorber units 261, 262, 263, and 264, and an optional antisway bar, not shown, may be used. The roll of the sprung weight about the instantaneous roll axis can also be controlled by the distance between the converging struts 241 and 242 or 251 and 252 at their closest points. As shown in FIG. 23, the closer these connections are to the front roll center 275 a rear roll center 276, the freer the movement. The greater that distance is, the more resistance there is to the roll of the car 50.

The roll center axis 277 may be placed away from the center of the vehicle 50 by asymmetric mounting of the converging struts 241 and 242 or 251 and 252, as demonstrated above, see FIG. 22, in order to obtain better performance for special applications. A specific application, as stated above is for Indianapolis-500 racing cars, which make only left-hand turns. All other points may be moved slightly to facilitate the best design.

The axle distance between each pair of spring-shock units 261, 262, and 263 and 264 should be maximum. The axle distance between the longitudinal struts 221 and 222 and that between struts 231 and 232 should also be the practical maximum. This minimizes the bending load on the axles 51 and 54 and on the frame 60.

The Doors (FIGS. 25-30)

Doors 280 (see FIG. 25) are preferably constructed as an outer approximately rectangular frame 281 attached to an inner approximately rectangular frame 282 (see FIG. 26) and to a skin absorber 283. Crash-energy-absorbing material 284 may be added between the skin absorber 283 and the outer frame 281. The inner and outer frames 281 and 282 are preferably made from steel tubing. The outer frame 281 comprises fore and aft posts 285 and 286 and upper and lower members 287 and 288, all welded to form the approximate rectangle. The inner frame 282 is identical in size, having front post 291, rear post (not visible) and upper and lower members 293 and 294. Additional triangulation and reinforcement bracing may be added by diagonal members 295 and 296 to the outer frame 281 and diagonal members (not visible) for the inner frame 282.

The skin absorber 283 may be made from sheet material and fastened to the frames 281 and 282 by fasteners or by welds to the top and bottom of the door 280.

In the event of a crash into the door 280, the skin absorber 283 bends in, absorbing some energy. The triangulation and reinforcing bracing help to absorb crash energy. Further crash energy is dissipated by the window posts 110 and 112 and by the frame members 101 and 103 which are major structural parts of the strong integral vehicle frame when the inner door frame 282 is forced against them.

A flat glass side window 297 rolls down from the roof bar 132 into the door 280 along the center line of the roof posts 111 and 113. The four straight roof posts 110, 111, 112, and 113, enable the side roll window 297 to be so placed that when it is up, it is bounded by the side roof bar 132 and the posts 111 and 113. There may be more or fewer than four posts. The side windows 297 are large, of flat glass, as are a windshield 331, described below, and a rear window 298, and provide maximum visibility, because of the thin roof posts, 110 and 111, 112 and 113. These roof posts are preferably made of solid round steel or aluminum or of bars to provide a strong and thin structure. These posts provide torque equalization between the front and rear sections of the frame 60, to prevent these two sections from moving relative to each other due to forces on the frame 60 around the roll center axis 277.

Figure 27:
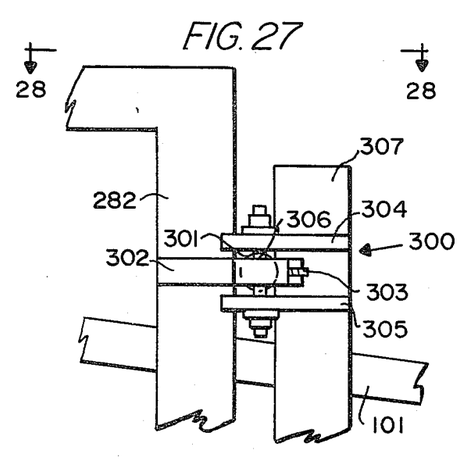
FIG. 27 is an enlarged fragmentary view in side elevation of the door hinge.
Figure 28:
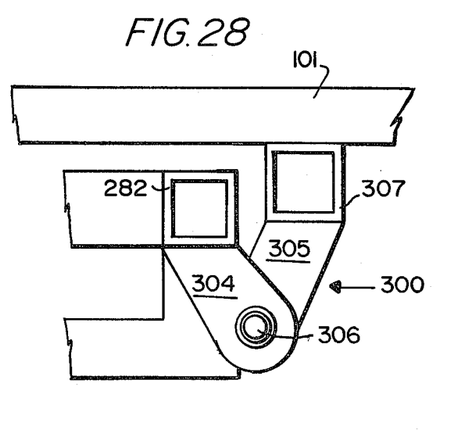
FIG. 28 is a top plan fragmentary view looking down in FIG. 27.

FIGS. 27 and 28 show a door hinge 300 with a spherical bearing 301 locked into a bearing plate 302 by set screws 303. The bearing plate 302 is welded to the door tube 282. Two hinge plates 304 and 305 are welded to a hinge tube 307 which is welded to frame side members 101 and 103. There are two hinges 300 for each door 280.

Figure 25:
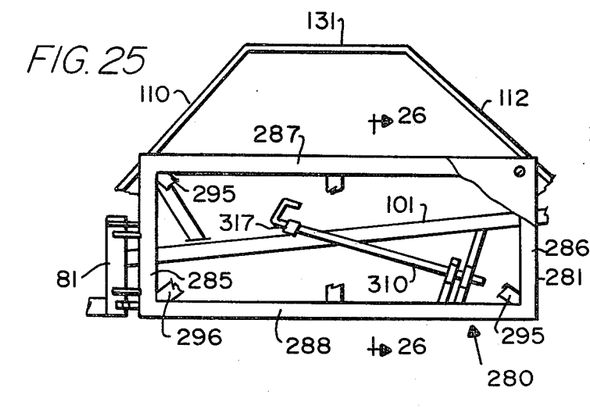
FIG. 25 is a fragmentary view in side elevation of the vehicle showing the door frame in place. Some parts thereof are broken away to prevent their obscuring other parts.
Figure 26:
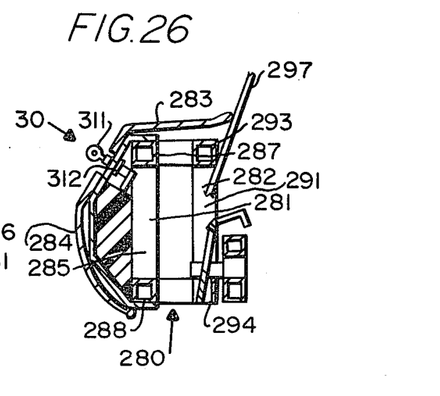
FIG. 26 is a view in section taken along the line 26—26 in FIG. 25, but also showing the outer aerodynamic body.
Figure 29:
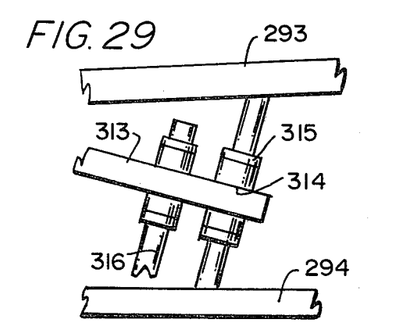
FIG. 29 is a fragmentary enlarged view of a portion of FIG. 25 showing the inside door latch.
Figure 30:
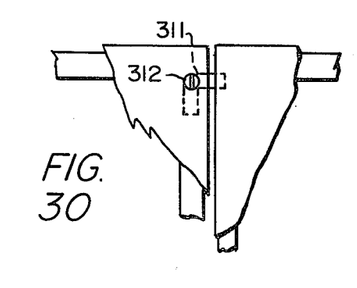
FIG. 30 is a fragmentary view in side elevation of a portion of FIG. 26, looking in the direction of the arrow 30 in FIG. 26, showing the outside door lock and associated parts.

FIGS. 25 and 29 show an inside door bolt or latch 310. The bolt or latch 310 is a shaft operated from inside the vehicle 50 only. From outside the car, a separate key 311 (FIG. 26) and lock 312 are used to lock the door 280 from the outside. The shaft 310 slides in an opening 314 of a door latch frame 315. The door 280 is locked when the shaft 313 is moved into the door opening 314. A frame 316 is welded to the door frame 281 of the vehicle. The frame 315 is welded to the frame member 101 or 103. The door latch 310 is fastened to a frame latch bracket 317, which is welded to the door frame 281. The frame opening 318 and the door opening 314 each have a shaft rubber washer 319. The door 280 is locked from the outside by the key 311 in the lock 312, which is mounted in a door plate 320, which is welded to the door 280. The lock 312 is secured in the door plate 320 with a lock nut 321.

Figure 31:
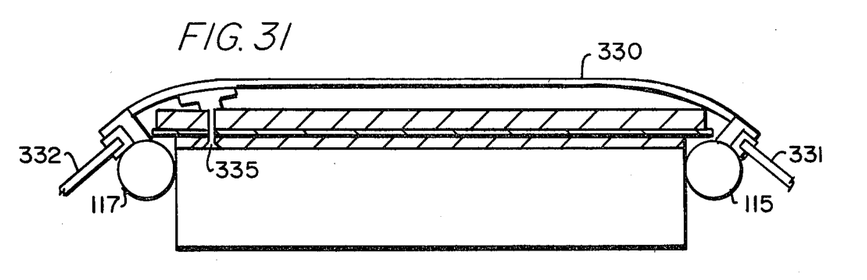
FIG. 31 is a fragmentary view in side elevation of the vehicle's roof.
Figure 32:
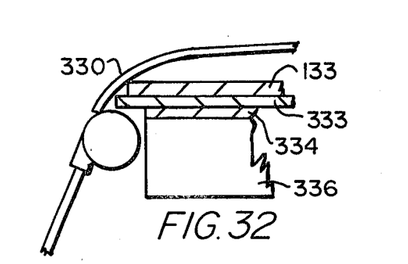
FIG. 32 is a fragmentary view in end elevation of one corner of the roof of FIG. 31.
Figure 33:
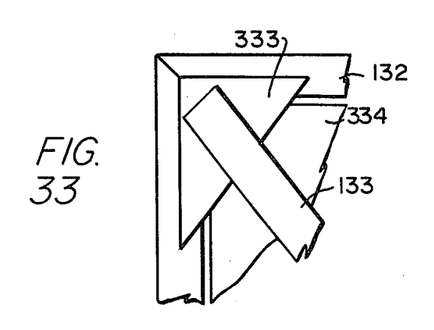
FIG. 33 is a fragmentary view looking up at one corner of the roof of FIG. 31.

The Roof (FIGS. 31-33)

FIGS. 31 to 33 show the roof 330 of the vehicle 50 with the windshield 331 and the rear window 332 fastened to the respective front and rear roof bars 115 and 117. Angles 333 (FIG. 33) are welded to the top roof frame bars 115, 117, 131, and 132. The X-braces 133 and 134 are welded or bolted to the angles 333. A panel 334 is fastened by a fastener 335 through the angle 333 and the X-brace 133 or 134 to the aerodynamic body 57. A slab 336 of plastic foam is mated to the panel 334 by glue or adhesive. A portion of a side window 297 is shown.

Figures 34, 35:
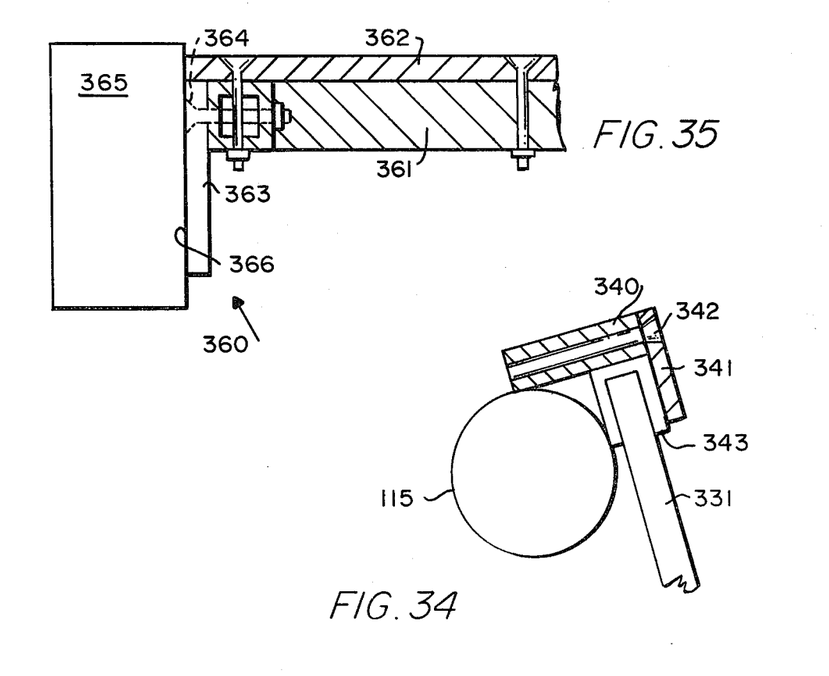
FIG. 34 is a fragmentary enlarged view in side elevation and in section of the front of the roof and the windshield, showing how the upper edge of the windshield is held.
FIG. 35 is a fragmentary view in section of a portion of the vehicle's dashboard.

FIG. 34 shows a cross section of the frame roof post 114, with the flat glass windshield 331, and a frame base 340 therefor welded to the roof post 115. The glass 331 is insulated from the frame 340 by a rubber folded strip 343. Similar structure is used for the other windows. The windshield 331 is retained in place by a strip 341 and bolt 342.

The Bumper (FIGS. 2 and 3)

FIGS. 2 and 3 show the front and rear crash absorbing bumpers 350. In the event of a crash into either end of the automobile 50, a bumper skin absorber or other absorbing material 351 bends in, cushioning the crash load into the bumper's rectangular frame 352. The bumper frame 352 can have triangulated and/or additional reinforcing bracing. Upon impact, bumper absorbers 353 absorb and cushion the load from the bumper frame 352, which is as wide as the vehicle 50 and runs from the bottom to the top of its forward deck and can accommodate the height of most other vehicle bumpers. There may be energy absorbing material 354 between the skin absorber 351 and the bumper frame 352. The bumper absorbers 353 transfer the crash load into the rectangular frame member 138 (or 144 at the rear) having a depending portion 355. The frame members 138 and 144 may have triangulated or additional reinforcing bracing. When the crash load goes into top and upwardly angled frame portions 356 and 357 of the members 135 and 136, the crash end of the vehicle will raise up and allow the bumper 350 to rotate about or near the frame member 137 (or 147 at the rear), and the portions 356 and 357 will bend. The vehicle 50 will be raised at the crash end, absorbing a great deal of crash energy since it takes a great deal of energy to raise the automobile 50 off the ground.

Passenger Compartment

The driver in the vehicle 50 is to occupy the center of three seats. This is the safest position for the operator of the vehicle, affording equal protection from either side. The center position also offers the driver equal visibility to the right and left.

FIG. 35 shows a dash board 360 with a tube structure 361. Panels 362 and 363 are attached to the tube structure 361 by fasteners 364. A slab 365 of foam is attached to the panel 363 by glue or adhesive 366 to absorb energy in the event of collision.

Wheel Bearings (FIG. 8)

The wheel bearing structure shown in FIG. 8, which applies to both the front and rear wheels, is also novel. Instead of having to machine out shoulders in a costly machining operation, the bearing housing 166 is provided with a cylindrical bore 385, in which is inserted an outer sleeve 386. The axle shaft 164 is surrounded by an inner sleeve 387, the sleeves 386 and 387 being of the same length and spaced apart radially. At each end of the two sleeves 386 and 387, they abut an anti-friction bearing 388. The bearings 388 are held in engagement with the sleeves 386 and 387 by retention disks 389, against each of which rests a lubricant seal 390, which bears between a portion of the shaft 164 and a second retention disk 391. The disks 389 and 391 are retained in place and held against the housing 166 by a series of bolts 392 passing through them, upon which nuts 393 are tightened.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. An automotive vehicle having a longitudinal axis and including in combination:
    a stationary rigid front axle assembly having wheels mounted at each end for rotation and steering means for turning said wheels,
    a stationary rigid rear axle assembly having wheels mounted at each end for rotation,
    a rigid frame enclosing and protecting a passenger compartment in between said front and rear axle assemblies and having forward and rear transverse members respectively near each end of said frame,
    a pair of widely spaced-apart, substantially parallel, forward struts on opposite sides of and parallel to said longitudinal axis and extending between a said forward transverse member and said front axle, connected to each of them by a universal joint at each end of said forward strut,
    a pair of widely spaced-apart, substantially parallel, rearward struts on opposite sides of and parallel to said longitudinal axis and extending between a said rear transverse member and said rear axle and connected to them by a universal joint at each end of said rearward strut,
    a pair of converging front struts connecting a said forward transverse member to said front axle by a universal joint at each end of each said front strut, said front struts being wide apart at one end and close to each other at the other end,
    a pair of converging rear struts connecting a said rear transverse member to said rear axle by a universal joint at each end of each said rear strut, said rear struts being wide apart at one end and close to each other at the other end, and
    vertically mounted spring and shock absorbing means between and bearing against said frame and each said axle on each side of said longitudinal axis.

2. The vehicle of claim 1 wherein said forward struts and said front struts are secured to the same said forward transverse member and said rearward and rear struts are secured to the same said rear transverse member.

3. The vehicle of claim 2 wherein the said forward transverse member lies to the rear of said front axle.

4. The vehicle of claim 2 wherein the said forward transverse member lies forward of said front axle.

5. The vehicle of claim 3 or 4 wherein said front struts converge toward said front axle assembly.

6. The vehicle of claim 3 or 4 wherein said front struts converge toward said forward transverse member.

7. The vehicle of claim 2 wherein said rear transverse member lies forward of said rear axle.

8. The vehicle of claim 2 wherein said rear transverse member lies to the rear of said rear axle.

9. The vehicle of claim 7 or 8 wherein said rear struts converge toward said rear axle.

10. The vehicle of claim 7 or 8 wherein said rear struts converge toward said rear transverse member.

11. The vehicle of claim 1 wherein said converging front struts are secured together at their closely adjacent ends along a common vertical axis intersecting said longitudinal axis, and said converging rear struts are secured together at their closely adjacent ends along another common vertical axis also intersecting said longitudinal axis.

12. The vehicle of claim 1 wherein said converging front struts are spaced somewhat apart from each other at their closely adjacent ends and said converging rear struts are spaced somewhat apart from each other at their closely adjacent ends.

13. The vehicle of either claim 11 or 12 wherein said converging front struts and said converging rear struts are respectively located symmetric to said longitudinal axis, converging toward said axis.

14. The vehicle of either claim 11 or 12 wherein said converging front struts and said converging rear struts are respectively asymmetric to said longitudinal axis, converging toward points spaced away from said axis.

15. The vehicle of claim 1 wherein both said front axle assembly and said rear axle assembly extends above the axis of the center of gravity of said vehicle, whereby the roll axis lies above the center-of-gravity axis of the vehicle.

16. An automotive vehicle having a longitudinal axis and including in combination:
    a stationary rigid front axis assembly having wheels mounted at each end for rotation and steering means for turning said wheels,
    a stationary rigid rear axle assembly having wheels mounted at each end for rotation,
    a rigid frame enclosing and protecting a passenger compartment in between said front and rear axle assemblies and having forward and rear transverse members respectively near each end of said frame,
    a pair of widely spaced-apart, substantially parallel, forward struts on opposite sides of and parallel to said longitudinal axis and extending between a said forward transverse member and said front axle, connected to each of them by a universal joint at each end of said forward strut,
    a pair of widely spaced-apart, substantially parallel, rearward struts on opposite sides of and parallel to said longitudinal axis and extending between a said rear transverse member and said rear axle and connected to them by a universal joint at each end of said rearward strut,
    a pair of converging front struts connecting a said forward transverse member to said front axle by a universal joint at each end of each said front strut, said front struts being wide apart at one end and close to each other at the other end,
    a pair of converging rear struts connecting a said rear transverse member to said rear axle by a universal joint at each end of each said rear strut, said rear struts being wide apart at one end and close to each other at the other end, and vertically mounted spring and shock absorbing means between and bearing against said frame and each said axle on each side of said longitudinal axis, said rigid frame defining said passenger compartment by upper and lower front horizontal transverse members joined at their ends by vertical members, upper and lower rear horizontal frame members joined at their ends by vertical members, upper and lower side members joined at each end to the upper and lower front and rear transverse members, respectively at frame corners, an X-frame member comprising two diagonal members each secured at each end to a lower transverse member and secured to each other where they cross, a rectangular roof frame, crossing diagonal members secured to corners of said roof frame and to each other, four generally vertical but somewhat inclined roof posts secured to said frame corners and to said roof frame corners, and two support members for each said roof post both secured in between the top and bottom of the roof post and one to one upper transverse member and one to one upper side member.

17. The vehicle of claim 1 having doors hinged to each side of said frame, each said door having an outer four-sided frame secured to an inner four-sided frame of substantially the same size and shape and having a shock-absorbing outer skin secured to said outer frame, and crash energy absorbing material in between said skin and said outer frame.

18. The vehicle of claim 17 wherein each said four-sided frame is strengthened by diagonal members connecting the corners thereof.

19. An automotive vehicle having a longitudinal axis and including in combination:
 a stationary rigid front axle assembly having a generally planar transverse frame with upper and lower beams and wheels mounted at each end for rotation and steering means for turning said wheels,
 a stationary rigid rear axle assembly having a generally planar transverse frame with upper and lower beams and wheels mounted at each end for rotation,
 a rigid frame enclosing and protecting a passenger compartment and located mainly in between said front and rear axle assemblies and having upper and lower forward and rear transverse members, respectively, near each end of said frame,
 a pair of widely spaced-apart substantially parallel forward struts on opposite sides of and substantially parallel to said longitudinal axis, each forward strut extending between a said lower forward transverse member and the lower beam of said front axle assembly and connected to each of them by a ball-and-socket joint,
 a pair of widely spaced-apart substantially parallel rearward struts on opposite sides of and substantially parallel to said longitudinal axis and extending between a said lower rear transverse member and said lower beam of rear axle assembly and connected to each of them by a ball-and-socket joint,
 a pair of converging front struts on opposite sides of said longitudinal axis, each extending between a said upper forward transverse member and the upper beam of said front axle assembly and connected to each of them by a ball-and-socket joint, said pair of front struts being wide apart at one end and closely adjacent to each other at the other end,
 a pair of converging rear struts on opposite sides of said longitudinal axis, each extending between a said upper rear transverse member and the upper beam of said rear axle assembly and connected to each of them by means of a ball-and-socket joint, said pair of converging struts being wide apart at one end and closely adjacent to each other at the other end, and
 four vertically mounted spring means between and bearing against said frame, two bearing against each said axle, one being on each side of said longitudinal axis for each axle.

20. The vehicle of claim 19 wherein said converging front struts are secured together and to said upper beam of said front axle assembly at their closely adjacent ends along a common vertical axis intersecting said longitudinal axis, and said converging rear struts are secured together and to said upper beam of said rear axle assembly at their closely adjacent ends along another common vertical axis also intersecting said longitudinal axis.

21. The vehicle of claim 19 having
 an upper clevis at each end of the upper beam of said front axle assembly,
 a lower clevis at each end of the lower beam of said front axle assembly and substantially coplanar therewith,
 a wheel-supporting plate having portions fitting into each said clevis,
 upper and lower king pins axially in line with each other extending vertically through both arms of each of the upper and lower clevises, respectively, and through said plate portions,
 a spherical bearing between the upper and lower areas of each said clevis, each having a passage therethrough through which said king pin passes,
 a thrust bearing between the upper arm of the upper clevis and its said spherical bearing and bearing against them both,
 a wheel-supporting horizontal cylindrical bearing secured to said plate,
 a stub shaft rotatably supported horizontally in each said bearing and extending outboard therefrom.
 said front wheels being mounted on said stub shafts,
 whereby the king pins together with their spherical bearings and said thrust bearing assure substantially vertical mounting of said wheels and a very short camber trail.

22. The vehicle of claim 19 having
 a vertical member at each end of said rear axle assembly, connecting its upper beam to its lower beam,
 a wheel-supporting plate secured to each said member,
 a wheel-supporting bearing secured to said plate, and
 a stub shaft rotatably supported horizontally in each said bearing and extending outboard therefrom,
 said rear wheels being mounted on said stub shafts.

23. The vehicle of claim 19 wherein each said axle assembly also includes two converging members extending out generally horizontally from the ends of said axle assembly and joined to each other.

24. An automotive vehicle having a longitudinal axis and including in combination:
 a front axle assembly having wheels mounted at each end for rotation and steering means for turning said wheels, a rear axle assembly having wheels mounted at each end for rotation, and a rigid frame enclosing and protecting a passenger compartment in between said front and rear axle assemblies and having forward and rear transverse members respectively near each end of said frame, said rigid frame defining said passenger compartment by upper and lower front horizontal transverse members joined at their ends by vertical member, upper and lower rear horizontal frame members joined at their ends by vertical members, upper and lower side members joined at each end to the upper and lower front and rear transverse members, respectively at frame corners, an X-frame member comprising two diagonal members each secured at each end to a lower transverse member and secured to each other where they cross, a rectangular roof frame, crossing diagonal members secured to corners of said roof frame and to each other, four generally vertical but somewhat inclined roof posts secured to said frame corners and to said roof frame corners, and two support members for each said roof post both secured in between the top and bottom of the roof post and one to one upper transverse member and one to one upper side member.

* * * * *